United States Patent
Fujimoto

(10) Patent No.: US 11,934,951 B2
(45) Date of Patent: Mar. 19, 2024

(54) CONTROL APPARATUS, CONTROL METHOD FOR CONTROL APPARATUS, NON-TRANSITORY COMPUTER READABLE STORAGE MEDIUM, INFORMATION PROCESSING SERVER, INFORMATION PROCESSING METHOD, AND CONTROL SYSTEM FOR CONTROLLING SYSTEM USING REINFORCEMENT LEARNING

(71) Applicant: HONDA MOTOR CO., LTD., Tokyo (JP)

(72) Inventor: Gakuyo Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 780 days.

(21) Appl. No.: 17/106,458

(22) Filed: Nov. 30, 2020

(65) Prior Publication Data

US 2021/0192344 A1    Jun. 24, 2021

(30) Foreign Application Priority Data

Dec. 24, 2019 (JP) .................................. 2019-233323

(51) Int. Cl.
G05B 13/02 (2006.01)
B60G 17/015 (2006.01)
(Continued)

(52) U.S. Cl.
CPC ............. *G06N 3/08* (2013.01); *B60G 17/015* (2013.01); *G05B 13/0265* (2013.01); *G07C 5/008* (2013.01)

(58) Field of Classification Search
CPC .................................................. G05B 13/0265
See application file for complete search history.

(56) References Cited

U.S. PATENT DOCUMENTS 6,917,925 B2    7/2005    Berenji et al.
10,564,619 B2   2/2020    Tsuneki et al.
(Continued)

FOREIGN PATENT DOCUMENTS

JP    H10-328980 A    12/1998
JP    2017-167866 A    9/2017
(Continued)

OTHER PUBLICATIONS

Japanese Office Action for Japanese Patent Application No. 2019-233323 dated Apr. 7, 2023 (partially translated).
(Continued)

*Primary Examiner* — Suresh Suryawanshi
(74) *Attorney, Agent, or Firm* — Thomas| Horstemeyer, LLP

(57) ABSTRACT

A control apparatus for performing predetermined control for a predetermined system using reinforcement learning detects an event in a life cycle of the predetermined system and, in response to the detection of the event, set an exploration parameter specified in accordance with the detected event as a value for adjusting a ratio of exploration in the reinforcement learning. The control apparatus executes the predetermined control using the reinforcement learning in accordance with the set exploration parameter. When a first event is detected, the control apparatus sets the exploration parameter so that makes the ratio of the exploration set during a first period after the first event is smaller than the ratio of the exploration set during a second period before the first event is detected.

16 Claims, 10 Drawing Sheets

(51) Int. Cl.
*G06N 3/08* (2023.01)
*G07C 5/00* (2006.01)

(56) References Cited

U.S. PATENT DOCUMENTS

| | | | |
|---|---|---|---|
| 10,831,361 | B2 | 11/2020 | Tsujimura et al. |
| 10,990,096 | B2 | 4/2021 | Isele et al. |
| 11,403,526 | B2* | 8/2022 | Redding .................. G06N 5/01 |
| 2002/0198854 | A1 | 12/2002 | Berenji et al. |
| 2017/0269811 | A1 | 9/2017 | Tsujimura et al. |
| 2018/0267499 | A1 | 9/2018 | Tsuneki et al. |
| 2018/0373245 | A1* | 12/2018 | Nishi ...................... G08G 1/161 |
| 2019/0035275 | A1* | 1/2019 | Nishi ...................... G08G 1/163 |
| 2019/0049957 | A1* | 2/2019 | Healey .................. A61B 5/0077 |
| 2019/0287007 | A1* | 9/2019 | Tsuneki ............... G05B 13/027 |
| 2019/0332110 | A1 | 10/2019 | Isele et al. |
| 2020/0150672 | A1* | 5/2020 | Naghshvar ............. G06N 3/006 |
| 2020/0319609 | A1* | 10/2020 | Qian ....................... G06N 3/045 |
| 2020/0346666 | A1* | 11/2020 | Wray ................. G01C 21/3407 |

FOREIGN PATENT DOCUMENTS

| | | |
|---|---|---|
| JP | 2018-151876 A | 9/2018 |
| JP | 2018-152012 A | 9/2018 |
| JP | 2019-087096 A | 6/2019 |

OTHER PUBLICATIONS

Chinese Office Action for Chinese Patent Application No. 202011398791.X dated Jun. 30, 2023 (partially translated).
Japanese Office Action for Japanese Patent Application No. 2019-233323 dated Oct. 31, 2022 (partially translated).

* cited by examiner

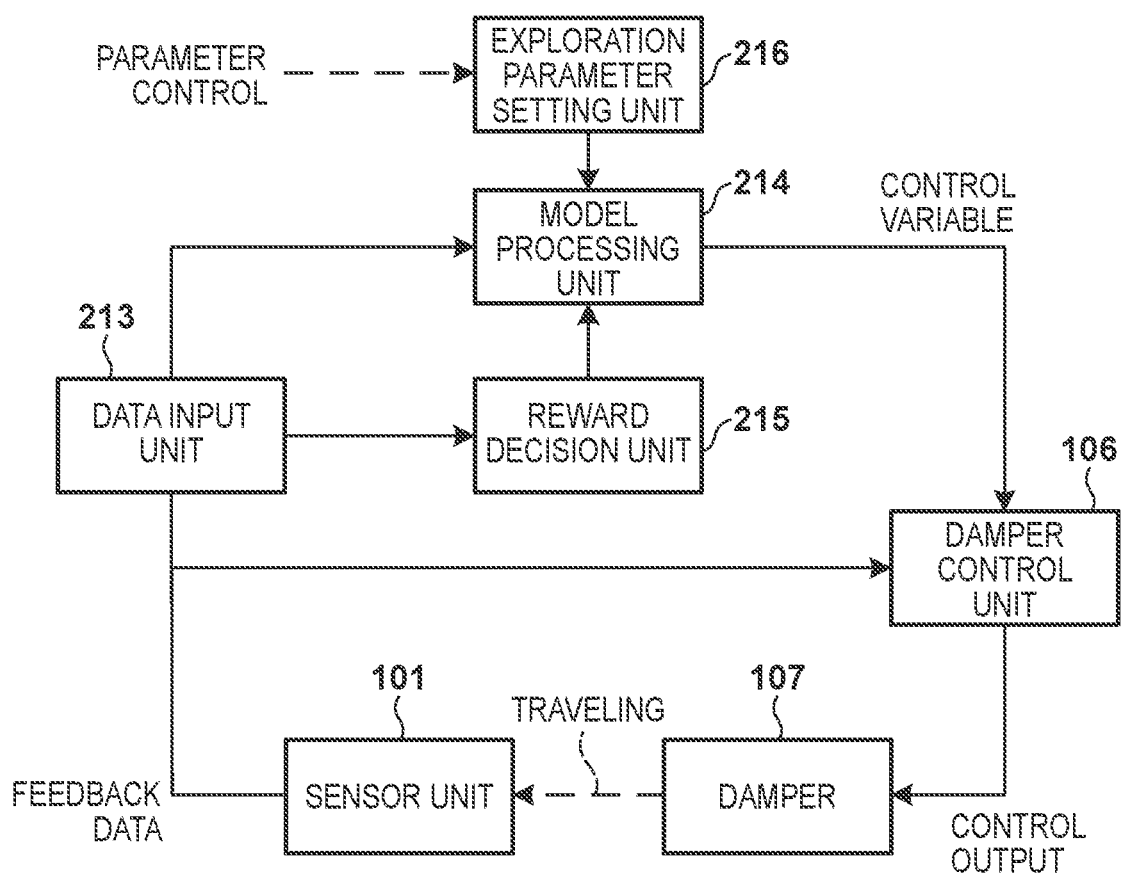

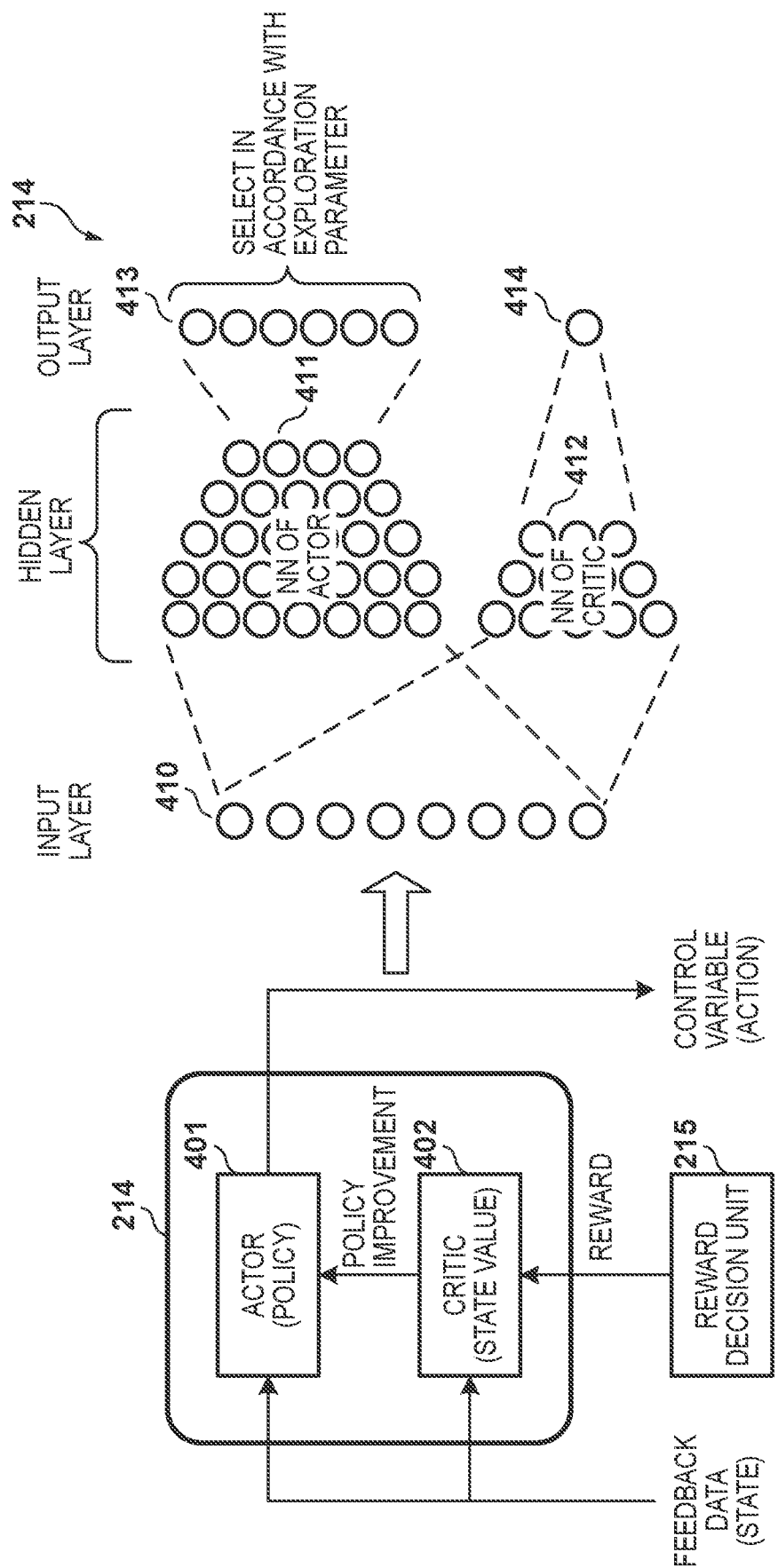

FIG. 5

| EXAMPLE OF SENSOR DATA TO BE MEASURED | SENSOR |
|---|---|
| VEHICLE SPEED | VEHICLE SPEED SENSOR |
| ACCELERATION OF VEHICLE BODY | ACCELERATION SENSOR IN DIRECTION OF X, Y, Z |
| DISPLACEMENT OF VEHICLE BODY | ACCELERATION SENSOR IN DIRECTION OF X, Y, Z |
| ANGULAR VELOCITY OF VEHICLE BODY | DISPLACEMENT SENSOR IN DIRECTION OF X, Y, Z |
| ACCELERATION OF TIRE POSITION (UNDER SPRING) | ACCELERATION SENSOR IN DIRECTION OF X, Y, Z |
| EXPAND OR CONTRACT SPEED OF SPRING | VELOCITY SENSOR IN DIRECTION OF X, Y, Z |
| EXPAND OR CONTRACT DISPLACEMENT OF SPRING | DISPLACEMENT SENSOR IN DIRECTION OF X, Y, Z |
| STROKE SPEED OF SUSPENSION (DAMPER) | DISPLACEMENT SENSOR OF SUSPENSION |
| STROKE DISPLACEMENT OF SUSPENSION (DAMPER) | DISPLACEMENT SENSOR OF SUSPENSION |
| STEERING INPUT | STEERING ANGLE SENSOR |
| ACCELERATION AND DECELERATION | ACCELERATOR POSITION, SENSOR OF BRAKE PEDAL FORCE |
| COMPLIANCE OF SUSPENSION | LOAD CELL |
| GPS DATA (SELF-POSITION) | GPS |
| TIRE AIR PRESSURE | TIRE AIR PRESSURE SENSOR |
| OPERATION OF EACH TYPE OF DYNAMICS CONTROLLING DEVICE | CONTROL SIGNAL OF EACH TYPE OF DYNAMICS CONTROLLING DEVICE |
| DISTANCE IMAGE | LIDAR |
| FRONT IMAGE | FRONT IMAGING CAMERA |

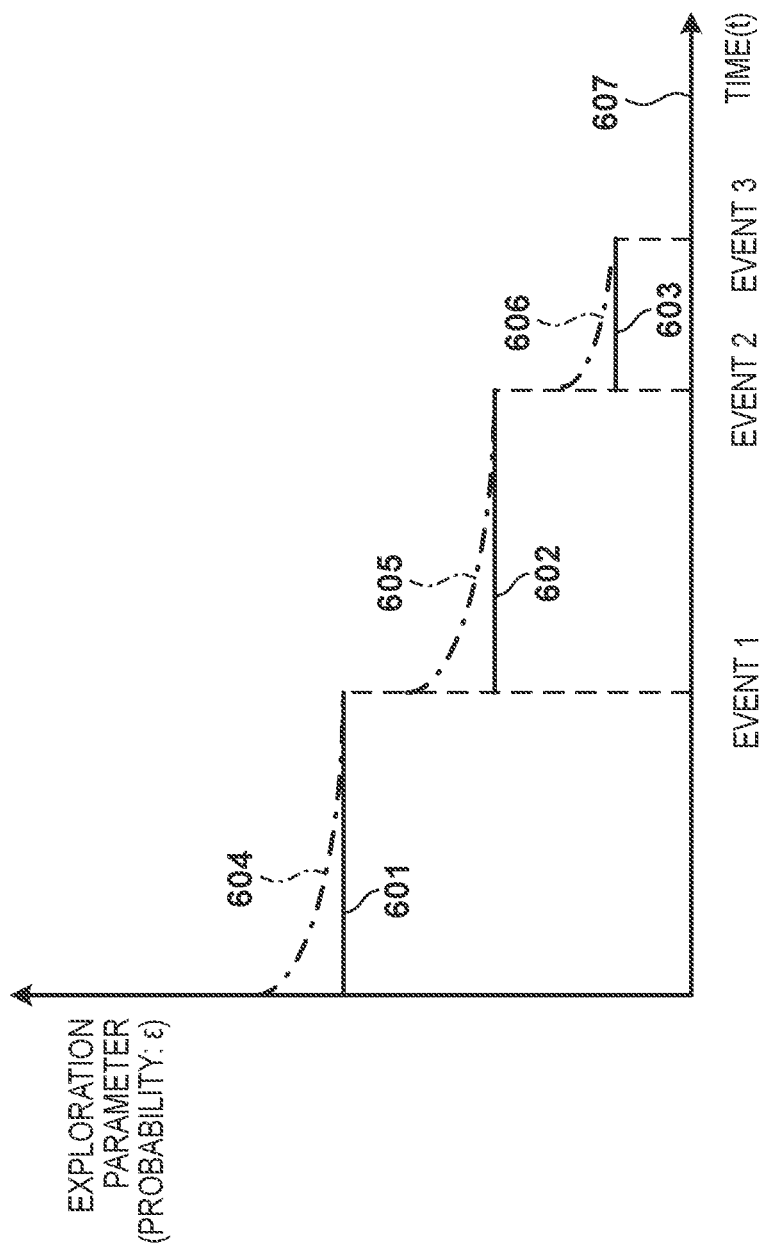

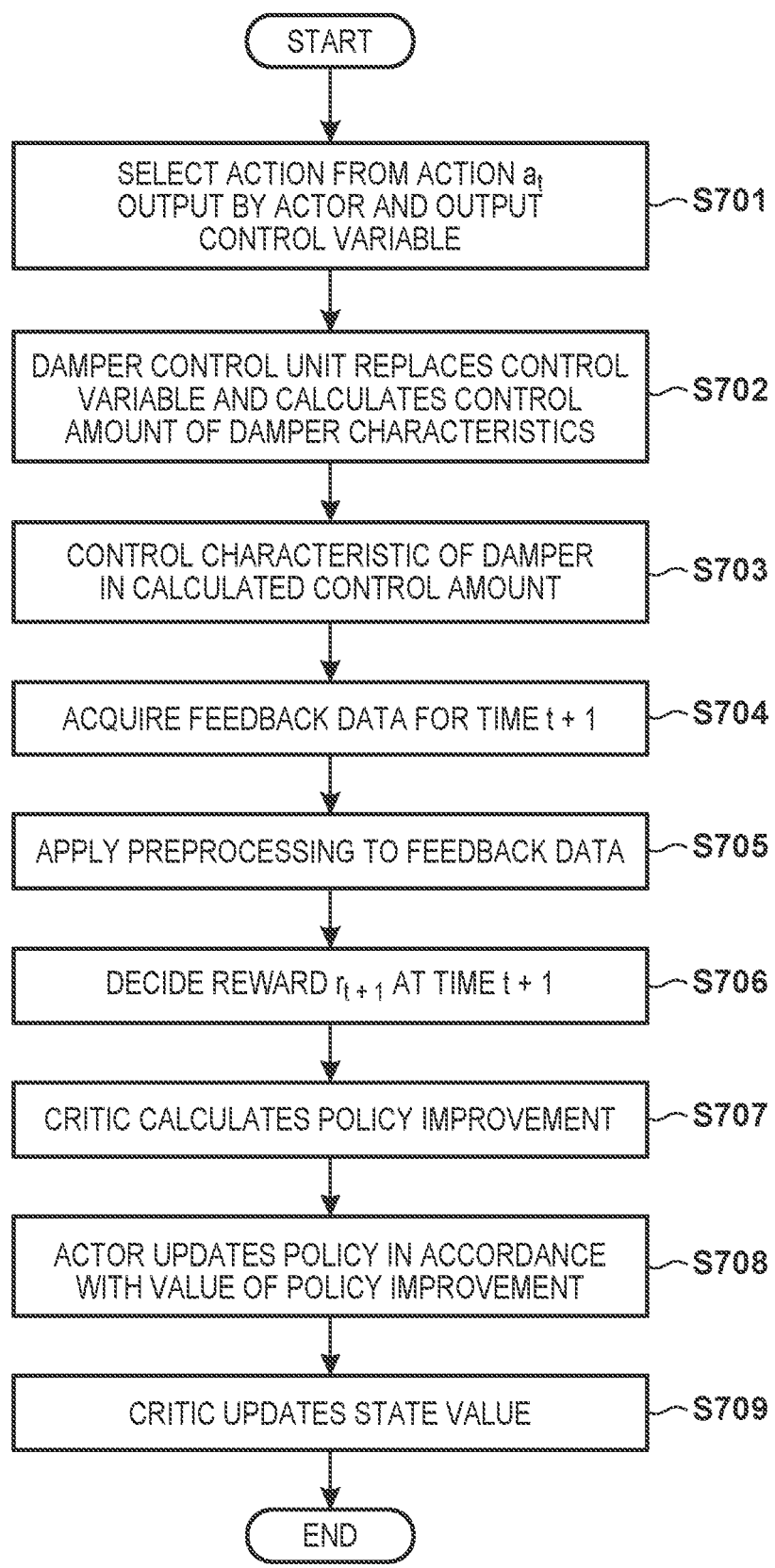

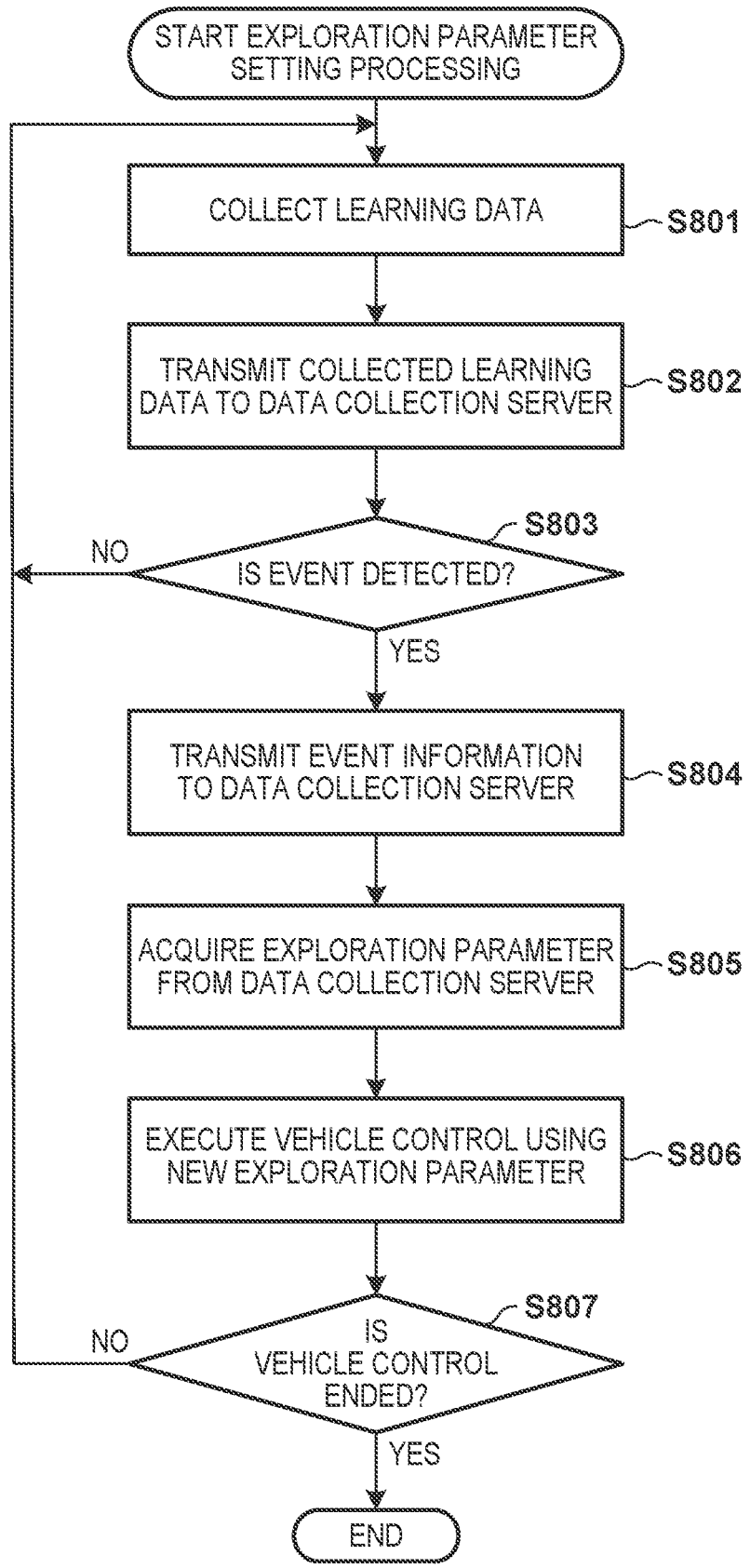

| EVENT | DESCRIPTION | EXPLORATION PARAMETER |
|---|---|---|
|  | (INITIAL VALUE BEFORE COMPLETION OF VEHICLE MANUFACTURING) | 0.100 |
| 1 | WHEN VEHICLE MANUFACTURING COMPLETED | 0.050 |
| 2 | TRAVEL OF PREDETERMINED TRAVELING DISTANCE (TH1) OR MORE | 0.020 |
| 3 | TRAVEL OF PREDETERMINED TRAVELING DISTANCE (TH2) OR MORE | 0.000 |

CONTROL APPARATUS, CONTROL METHOD FOR CONTROL APPARATUS, NON-TRANSITORY COMPUTER READABLE STORAGE MEDIUM, INFORMATION PROCESSING SERVER, INFORMATION PROCESSING METHOD, AND CONTROL SYSTEM FOR CONTROLLING SYSTEM USING REINFORCEMENT LEARNING

CROSS-REFERENCE TO RELATED APPLICATION(S)

This application claims priority to and the benefit of Japanese Patent Application No. 2019-233323 filed on Dec. 24, 2019, the entire disclosure of which is incorporated herein by reference.

BACKGROUND OF THE INVENTION

Field of the Invention

The present invention relates to a control apparatus, a control method for the control apparatus, a non-transitory computer readable storage medium, an information processing server, an information processing method, and a control system for controlling a system using reinforcement learning.

Description of the Related Art

In recent years, there is known a technique of using reinforcement learning for action control for implementing autonomous traveling of a vehicle (Japanese Patent Laid-Open No. 2019-087096). Japanese Patent Laid-Open No. 2019-087096 discloses a technique (to be also called the s-greedy method) of randomly selecting an action at a probability ε in a process of learning a policy (indicating an action selection rule) in reinforcement learning, and selecting an action in accordance with the policy at a probability 1−ε. That is, to acquire a more appropriate policy by learning, it is necessary to perform both exploration for obtaining more various action policies and exploitation of the learned policy.

If a commercialized vehicle that performs action control by reinforcement learning travels on the market, it is assumed that exploration in action control is not performed so as to output a unique control signal that has undergone a test or the like in a learned state. On the other hand, to implement high-dimensional action control such as autonomous traveling, learning for exploring an optimum action from a wide action space is necessary. It may be desired to collect and use learning data for learning, particularly various data obtained in the actual environment, even after introducing the vehicle into the market.

SUMMARY OF THE INVENTION

The present disclosure has been made in consideration of the aforementioned issues, and realizes a technique capable of continuously performing both exploration and exploitation in reinforcement learning in a life cycle of a vehicle in control of the vehicle.

In order to solve the aforementioned problems, one aspect of the present disclosure provides a control apparatus for performing predetermined control for a predetermined system using reinforcement learning, comprising: one or more processors; and a memory storing instructions which, when the instructions are executed by the one or more processors, cause the control apparatus to function as: a detection unit configured to detect an event in a life cycle of the predetermined system; a setting unit configured to, in response to the detection of the event, set an exploration parameter specified in accordance with the detected event as a value for adjusting a ratio of exploration in the reinforcement learning; and a processing unit configured to execute the predetermined control using the reinforcement learning in accordance with the set exploration parameter, wherein when a first event is detected, the setting unit sets the exploration parameter so that the ratio of the exploration set during a first period after the first event is smaller than the ratio of the exploration set during a second period before the first event is detected.

Another aspect of the present disclosure provides, a control method for a control apparatus that performs predetermined control for a predetermined system using reinforcement learning, comprising: detecting an event in a life cycle of the predetermined system; setting, in response to the detection of the event, an exploration parameter specified in accordance with the detected event as a value for adjusting a ratio of exploration in the reinforcement learning; and executing the predetermined control using the reinforcement learning in accordance with the set exploration parameter, wherein when a first event is detected, the exploration parameter is set in the setting so that the ratio of the exploration set during a first period after the first event is smaller than the ratio of the exploration set during a second period before the first event is detected.

Still another aspect of the present disclosure provides, a non-transitory computer readable storage medium storing an instruction for executing a control method for a control apparatus that performs predetermined control for a predetermined system using reinforcement learning, the instruction causing, when executed by a processor of the control apparatus, the processor to execute: detecting an event in a life cycle of the predetermined system; setting, in response to the detection of the event, an exploration parameter specified in accordance with the detected event as a value for adjusting a ratio of exploration in the reinforcement learning; and executing the predetermined control using the reinforcement learning in accordance with the set exploration parameter, wherein when a first event is detected, the exploration parameter is set in the setting so that the ratio of the exploration set during a first period after the first event is smaller than the ratio of the exploration set during a second period before the first event is detected.

Yet another aspect of the present disclosure provides, an information processing server for performing predetermined control for a predetermined system using reinforcement learning, comprising: one or more processors; and a memory storing instructions which, when the instructions are executed by the one or more processors, cause the information processing server to function as: a detection unit configured to detect an event in a life cycle of the predetermined system; a setting unit configured to, in response to the detection of the event set an exploration parameter specified in accordance with the detected event as a value for adjusting a ratio of exploration in the reinforcement learning; a processing unit configured to execute processing for the predetermined control using the reinforcement learning in accordance with the set exploration parameter; and a transmission unit configured to transmit a processing result of the processing unit to the predetermined system, wherein when a first event is detected, the setting unit sets the exploration parameter so that the ratio of the exploration set during a first period after the first event is smaller than the ratio of the exploration set during a second period before the first event is detected.

Yet still another aspect of the present disclosure provides, an information processing method, executed by an information processing server, of performing predetermined control for a predetermined system using reinforcement learning, the method comprising: detecting an event in a life cycle of the predetermined system; setting, in response to the detection of the event, an exploration parameter specified in accordance with the detected event as a value for adjusting a ratio of exploration in the reinforcement learning; executing processing for the predetermined control using the reinforcement learning in accordance with the set exploration parameter; and transmitting a processing result in the executing to the predetermined system, wherein when a first event is detected, the exploration parameter is set in the setting so that the ratio of the exploration set during a first period after the first event is smaller than the ratio of the exploration set during a second period before the first event is detected.

Still yet another aspect of the present disclosure provides, a control system comprising a control apparatus configured to perform predetermined control for a predetermined system using reinforcement learning, and an information processing server, the control apparatus comprising: one or more processors; and a memory storing instructions which, when the instructions are executed by the one or more processors, cause the control apparatus to function as: a detection unit configured to detect an event in a life cycle of the predetermined system, a first transmission unit configured to transmit, in response to the detection of the event, the detected event to the information processing server, a setting unit configured to set an exploration parameter specified in accordance with the event and received from the information processing server as a value for adjusting a ratio of exploration in the reinforcement learning, and a processing unit configured to execute the predetermined control using the reinforcement learning in accordance with the set exploration parameter, wherein when a first event is detected, the setting unit sets the exploration parameter so that the ratio of the exploration set during a first period after the first event is smaller than the ratio of the exploration set during a second period before the first event is detected, and the information processing server comprising: one or more processors; and a memory storing instructions which, when the instructions are executed by the one or more processors, cause the information processing server to function as: a specifying unit configured to specify the exploration parameter in accordance with the event, and a second transmission unit configured to transmit the specified exploration parameter to the predetermined system.

According to the present invention, it is possible to continuously perform both exploration and exploitation in reinforcement learning in a life cycle of a vehicle in control of the vehicle.

Further features of the present invention will become apparent from the following description of exemplary embodiments (with reference to the attached drawings).

BRIEF DESCRIPTION OF THE DRAWINGS

FIG. 3 is a view for explaining an overview of a damper control operation as an example of control using reinforcement learning according to the embodiment:

FIG. 4 is a view for explaining an arrangement when an actor-critic method is applied as an example of reinforcement learning in a model processing unit according to the embodiment;

FIG. 5 is a table showing examples of a usable sensor and sensor data measured by the sensor according to the embodiment;

FIG. 6 is a timing chart showing an example of a change in exploration parameter according to the embodiment;

FIG. 7 is a flowchart illustrating a series of operations of damper control processing in the vehicle according to the embodiment:

FIG. 8 is a flowchart illustrating a series of operations of exploration parameter setting processing in the vehicle according to the embodiment;

DESCRIPTION OF THE EMBODIMENTS

Figure 1:
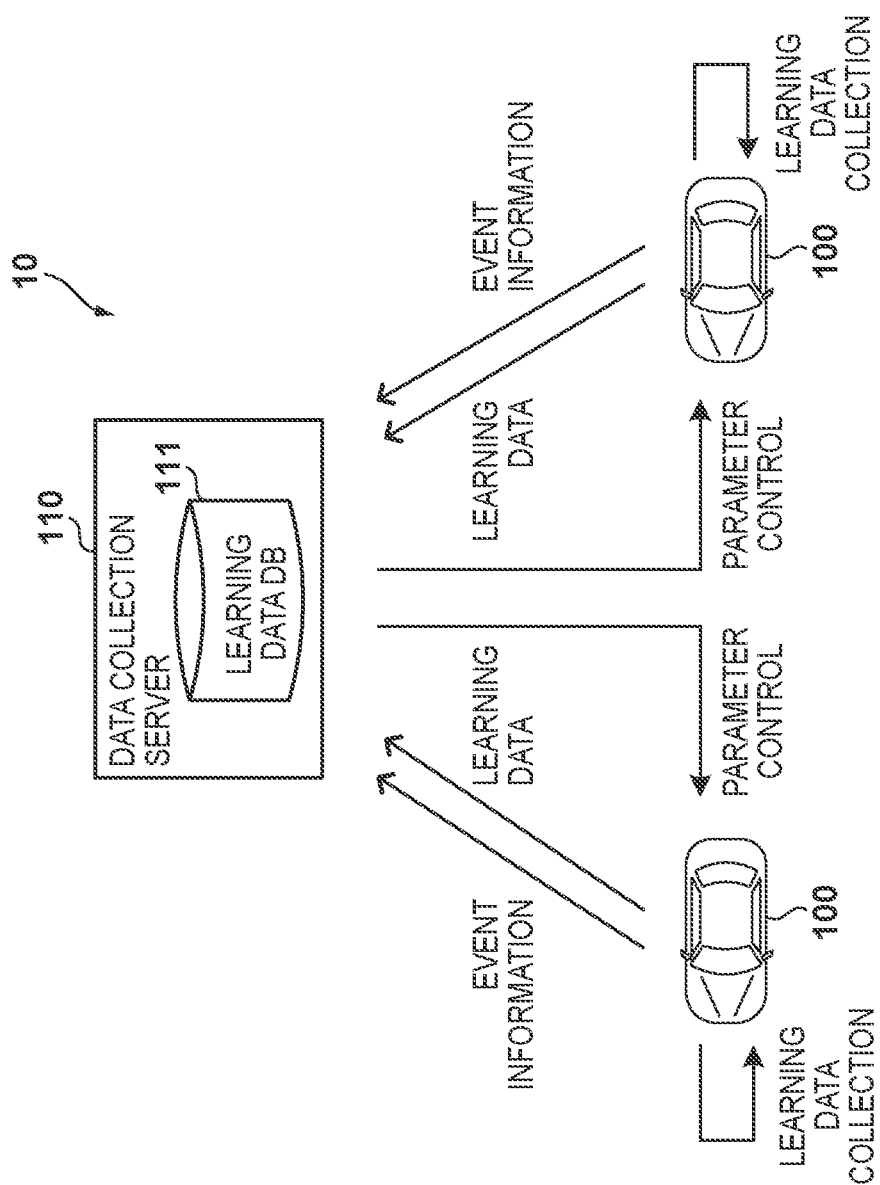
FIG. 1 is a view showing an overview of a vehicle control system according to an embodiment of the present invention.

Hereinafter, embodiments will be described in detail with reference to the attached drawings. Note that the following embodiments are not intended to limit the scope of the claimed invention, and limitation is not made to an invention that requires all combinations of features described in the embodiments.

Two or more of the multiple features described in the embodiments may be combined as appropriate. Furthermore, the same reference numerals are given to the same or similar configurations, and redundant description thereof is omitted.

<Overview of Vehicle Control System>

An overview of a vehicle control system 10 according to an embodiment will be described with reference to FIG. 1. The vehicle control system 10 includes a vehicle 100 as an example of a predetermined system, and a data collection server 110 as an example of an information processing server. This embodiment will exemplify a case in which the vehicle 100 controls a damper as a constituent element of the vehicle using reinforcement learning. However, the present invention is also applicable when the vehicle performs control (for example, steering or acceleration control at the time of traveling) of a constituent element other than the damper using reinforcement learning. The embodiment to be described below will exemplify a case in which a control unit of the vehicle performs damper control using reinforcement learning. However, the processing by the control unit may be performed by an information processing apparatus mounted in the vehicle. That is, this embodiment may be implemented by an arrangement in which the information processing apparatus acquires sensor information and the like from the vehicle, and outputs, to the vehicle, a control signal for damper control using reinforcement learning.

Note that in the following description, the information processing apparatus or the control unit of the vehicle may be referred to as a control apparatus hereinafter.

The data collection server 110 is a server for acquiring and accumulating learning data for learning a learning model using reinforcement learning. The data collection server 110 acquires, from each of a plurality of vehicles 100, learning data collected by each of the plurality of vehicles 100 controlled in the actual environment. Although described in detail later, the learning data includes feedback data acquired by a sensor of the vehicle 100. The learning data may include other information (that is, input/output information to be used in reinforcement learning) of rewards and actions. The data collection server 110 accumulates the learning data acquired from the vehicles 100 in a database (DB) 111.

The data collection server 110 according to this embodiment acquires event information from each vehicle 100 controlled in the actual environment, and performs parameter control of the vehicle 100 in accordance with the acquired event information. The event information is information indicating an event occurring in a life cycle of the vehicle 100. Examples of the event are completion of a procedure for the vehicle (completion of vehicle manufacturing or completion of vehicle registration), reaching to a specific use state of the vehicle (a lapse of a predetermined number of days after completion of manufacturing or traveling of a predetermined traveling distance after completion of manufacturing), and update of a constituent element for controlling the vehicle (a predetermined number of times of update of the version of the learning model).

When deciding a policy in control using reinforcement learning, for example, the vehicle 100 selects (that is, explores) a random action with a predetermined probability $\varepsilon$, and selects (that is, exploits) an action in accordance with an output of the policy at a probability $1-\varepsilon$. With respect to the vehicle 100, the data collection server 110 controls a parameter (in this example, the probability $\varepsilon$) for each vehicle in accordance with the occurrence of an event corresponding to the life cycle of each vehicle 100. The vehicle 100 establishes the balance between exploration and exploitation in reinforcement learning in accordance with the parameter (probability $\varepsilon$) designated by the data collection server 110. In this way, the data collection server 110 can collect various data including variations to some extent from each vehicle 100 in the actual environment. In addition, it is possible to improve the performance of a model using the collected learning data. Note that as will be described later, if an output that cannot be allowed for safety reasons is selected by exploration of a reinforcement learning algorithm, an output value is filtered out so as not to control the vehicle by the output.

<Arrangement of Vehicle>

Figure 2:
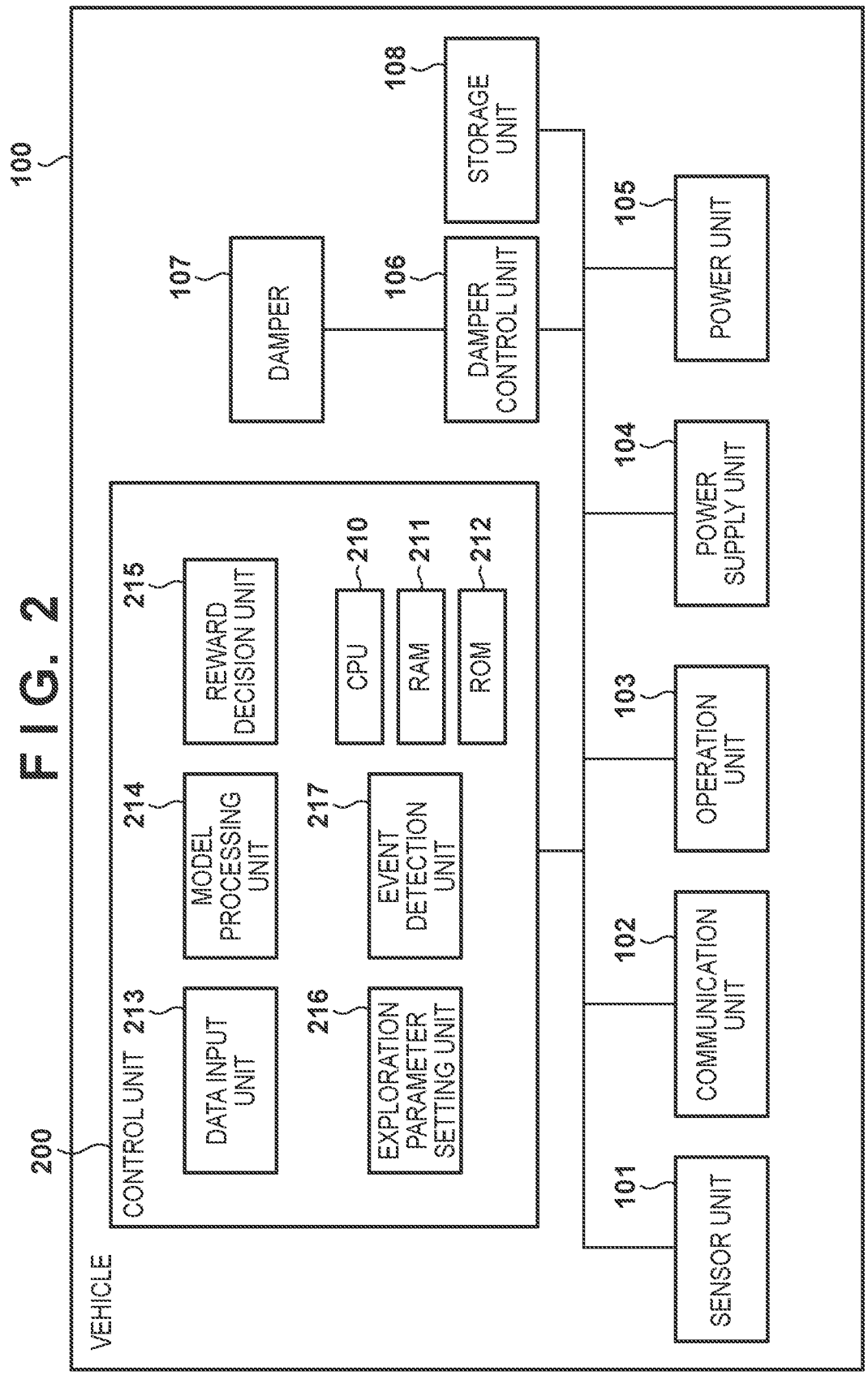
FIG. 2 is a block diagram showing an example of the functional arrangement of a vehicle according to the embodiment.

An example of the functional arrangement of the vehicle 100 according to this embodiment will be described next with reference to FIG. 2. Note that functional blocks to be described with reference to FIG. 2 may be integrated or separated, and a function to be described may be implemented by another block. A function described as hardware may be implemented by software and vice versa.

A sensor unit 101 includes various sensors provided in the vehicle 100, and outputs sensor data concerning the behavior of the vehicle 100. FIG. 5 shows examples of various sensors of the sensor unit 101 and measurement contents, which can be used for damper control processing according to this embodiment. These sensors include, for example, a vehicle speed sensor for measuring the vehicle speed of the vehicle 100, an acceleration sensor for measuring the body acceleration of the vehicle, and a suspension displacement sensor for measuring the stroke behavior (speed and displacement) of the damper. Furthermore, the sensors further include a steering angle sensor for measuring a steering input, and a GPS for acquiring a self-position. Note that in the following description, these sensor data concerning the behavior of the vehicle 100 used for damper control processing will particularly be referred to as feedback data hereinafter. The feedback data concerning the behavior of the vehicle 100 output from the sensor unit 101 are input to a control unit 200 and a damper control unit 106.

The sensor unit 101 may include an imaging camera for outputting a captured image obtained by capturing the front side (or the rear side or periphery) of the vehicle, and a Lidar (Light Detection and Ranging) for outputting a distance image obtained by measuring the distance on the front side (or the rear side or periphery) of the vehicle. For example, the control unit 200 may perform action control of the vehicle 100 or damper control using reinforcement learning by using, as feedback data, spatial information such as a distance image or a captured image.

A communication unit 102 is, for example, a communication device including a communication circuit, and communicates with an external server or a surrounding traffic system via mobile communication standardized as LTE, LTE-Advanced, or so-called 5G. The communication unit 102 can receive some or all of map data from the external server, and receive traffic information and the like from another traffic system. The communication unit 102 transmits various data (for example, the feedback data) acquired from the sensor unit 101 and event information to the data collection server 110. Then, the communication unit 102 receives information (for example, information indicating the probability $\varepsilon$ for performing exploration) (to be referred to as an exploration parameter hereinafter) concerning parameter control from the data collection server 110.

An operation unit 103 includes members such as a steering and a brake pedal that accept inputs for driving the vehicle 100 in addition to operation members such as buttons and a touch panel attached in the vehicle 100. A power supply unit 104 includes, for example, a battery formed by a lithium ion battery, and supplies power to each unit in the vehicle 100. A power unit 105 includes, for example, an engine and a motor for generating power to cause the vehicle to travel.

A damper 107 is used for a suspension of the vehicle 100, and is, for example, an active damper capable of controlling a damping force as the characteristic of the damper. For example, with respect to control of the damper 107, a pressure to open an internal valve is adjusted by controlling a current amount to flow through a coil in the damper 107, thereby controlling the damping force of the damper 107. The damper 107 comprises four individual dampers 107 which are individually controlled. Note that if the vehicle 100 performs, for example, action control (control different from damper control) of the vehicle using reinforcement learning, the dampers 107 may be normal dampers.

The damper control unit 106 is, for example, a software module for controlling the characteristic of the damper 107, and controls the characteristic of each damper (each of the four individual dampers 107) based on a control variable output from the control unit 200. Note that in this embodiment, the damper control unit 106 controls each damper 107 to ensure high-speed responsiveness required for damper control. However, the damper control unit 106 is not always essential, and the control unit 200 may control each damper 107 directly.

A storage unit 108 includes a nonvolatile mass storage device such as a semiconductor memory. The storage unit 108 temporarily stores the feedback data output from the sensor unit 101 or the feedback data selected by the control unit 200 to be transmitted to the data collection server 110.

The control unit 200 includes, for example, a CPU 210, a RAM 211, and a ROM 212, and controls the operation of each unit of the vehicle 100. The control unit 20 acquires the feedback data from the sensor unit 101 to execute the damper control processing, and controls the balance between exploration and exploitation in reinforcement learning in accordance with the exploration parameter received from the data collection server 110. The control unit 200 exhibits the functions of a data input unit 213, a model processing unit 214, a reward decision unit 215, and an exploration parameter setting unit 216 when the CPU 210 loads a computer program stored in the ROM 212 into the RAM 211 and executes it.

The CPU 210 includes one or more processors. The RAM 211 includes, for example, a DRAM, and functions as the work memory of the CPU 210. The ROM 212 is formed by a nonvolatile storage medium, and stores the computer program to be executed by the CPU 210, setting values to be used to operate the control unit 200, and the like. Note that the following embodiment will exemplify a case in which the CPU 210 executes processing of the model processing unit 214. However, the processing of the model processing unit 214 may be executed by one or more other processors (for example, GPUs) (not shown).

The data input unit 213 acquires the feedback data stored in the storage unit 108, and executes preprocessing of data. The data input unit 213 performs various kinds of processes so that a machine learning algorithm readily processes the feature of driving input and the motion state of the vehicle, which are input as the feedback data. An example of the process includes a process of processing the feedback data to the maximum or minimum value of the feedback data within a predetermined period. By processing the feedback data in advance, the processing efficiency and the learning efficiency can be improved, as compared with a case in which the machine learning algorithm processes the raw feedback data directly. Note that in the example of this embodiment, a case in which the feedback data processed by the data input unit 213 is transmitted to the data collection server 110 as learning data will be exemplified. However, the feedback data which has not been processed by the data input unit 213 may be used as learning data for reinforcement learning or may be transmitted to the data collection server 110.

For example, the model processing unit 214 performs calculation of the machine learning algorithm such as deep reinforcement learning, thereby outputting an obtained output to the damper control unit 106. The model processing unit 214 executes the reinforcement learning algorithm using the feedback data obtained from the data input unit 213 and reward data obtained from the reward decision unit 215, thereby outputting the control variable to be provided to the damper control unit 106. The model processing unit 214 optimizes (that is, learns) intrinsic parameters by executing the reinforcement learning algorithm, and applies calculation processing specified by the intrinsic parameters to the feedback data, thereby outputting an optimum control variable corresponding to the behavior of the vehicle 100. The model processing unit 214 includes processing of selecting, in accordance with the exploration parameter, an action from a plurality of actions output from a neural network (actor) associated with a policy.

The reward decision unit 215 decides, based on the feedback data, a reward or penalty to be used by the machine learning algorithm (reinforcement learning algorithm), and outputs it to the model processing unit 214. The exploration parameter setting unit 216 sets, in the model processing unit 214, the exploration parameter acquired from the data collection server 110.

An event detection unit 217 detects an event occurring in the life cycle of the vehicle 100 based on information measured by the sensor unit 101 of the vehicle 100, version information of a learning model operating in the model processing unit 214, and the like, and transmits the detected event as event information to the data collection server 110. The event information is information indicating an event occurring in the life cycle of the vehicle 100. As described above, examples of the event are completion of a procedure for the vehicle (completion of vehicle manufacturing or completion of vehicle registration), reaching to a specific use state of the vehicle (a lapse of a predetermined number of days after completion of manufacturing or traveling of a predetermined traveling distance after completion of manufacturing), and update of a constituent element for controlling the vehicle (a predetermined number of times of update of the version of the learning model).

<Overview of Damper Control Processing Using Reinforcement Learning>

An overview of the damper control processing using reinforcement learning will be described next with reference to FIG. 3.

The damper control processing according to this embodiment includes, for example, calculation processing using a deep reinforcement learning algorithm in the model processing unit 214 and calculation processing in the damper control unit 106. In this arrangement, the damper control unit 106 can control a low-dimensional control output at a high-speed operating frequency of several hundred Hz by predetermined rule-based calculation processing while the model processing unit 214 can execute high-dimensional control at an operating frequency not as high as that of the damper control unit. The damper control arrangement is not limited to this, as a matter of course. The model processing unit 214 may directly control each damper 107 without providing the damper control unit 106.

For example, at given time t, the model processing unit 214 accepts the feedback data from the data input unit 213 to execute the reinforcement learning algorithm, and outputs an obtained control variable to the damper control unit 106. In reinforcement learning, the feedback data corresponds to a state ($s_t$) of an environment and the control variable corresponds to an action ($a_t$) for the environment.

Upon accepting the control variable from the model processing unit 214, the damper control unit 106 replaces the control variable used in itself with the new control variable acquired from the model processing unit 214. The control variable includes, for example, a parameter used by the damper control unit 106 to decide the characteristic of the damper, such as a gain parameter corresponding to the feedback data. Furthermore, the control variable also serves as a parameter used by the damper control unit 106 to decide the damping force of each damper 107 based on the known skyhook theory. For example, the damping force of each damper 107 is controlled so that the body acceleration of the vehicle measured by the sensor unit 101 of the vehicle 100 matches an acceleration based on the skyhook theory.

The damper control unit 106 controls the damper characteristic for the feedback data based on the new control variable obtained from the model processing unit 214. At this time, the damper control unit 106 calculates a control amount for controlling the characteristic of each damper 107. For example, the characteristic of each damper 107 is the damping force, and the control amount for controlling the characteristic of each damper 107 is a current amount for controlling the damping force. The damper control unit 106 repeats damper control for the feedback data based on the new control variable until time t+1 is reached.

The sensor unit 101 acquires the feedback data at time t+1, and the data input unit 213 processes the feedback data and outputs the processed feedback data to the model processing unit 214. In reinforcement learning, the processed feedback data corresponds to a state ($s_{t+1}$) in the environment. The reward decision unit 215 decides a reward ($r_{t+1}$)(or penalty) in reinforcement learning based on the feedback data, and provides it to the model processing unit 214. In this embodiment, the reward is a reward value concerning the behavior of the vehicle, which is obtained from a combination of predetermined feedback data.

Upon accepting the reward ($r_{t+1}$), the model processing unit 214 updates a policy and a state value function (both will be described later), and outputs a new control variable for the feedback data at time t+1 (action ($a_{t+1}$)).

<Arrangement of Model Processing Unit>

An example of the arrangement of the model processing unit 214 and an example of the operation of the model processing unit 214 in the damper control processing will further be described with reference to FIG. 4. FIG. 4 schematically shows an example of the internal arrangement of the model processing unit 214 when the actor-critic method is used and an example of the network configuration of the neural networks (NNs) of the model processing unit 214.

The model processing unit 214 includes an actor 401 and a critic 402. The actor 401 is a mechanism for selecting an action (a) based on a policy π(s, a). As an example, when p(s, a) represents a probability of selecting the action a in a state s, the policy is defined by p(s, a) and a predetermined function using, for example, the softmax function. The critic 402 is a mechanism for performing evaluation of the policy π(s, a) currently used by the actor, and has a state value function V(s) representing the evaluation.

By exemplifying the operation from time t to time t+1 described with reference to FIG. 3, the actor 401 accepts the feedback data at given time t, and outputs a control variable (that is, the action ($a_t$)) based on the policy π(s, a).

If the feedback data (that is, the state ($s_t$+j)) at time t+1 is obtained after the damper control unit 106 performs damper control using the control variable for time t, the reward decision unit 215 inputs the reward ($r_{t+1}$) based on the feedback data to the critic 402.

The critic 402 calculates a policy improvement for improving the policy of the actor, and inputs it to the actor 401. The policy improvement may be obtained by a known predetermined calculation method. For example, a known TD error $\delta_t = r_{t+1} + \gamma V(s_{t+1}) - V(s_t)$ (γ represents a discount reward in reinforcement learning) obtained using the reward and the feedback data can be used as the policy improvement.

The actor 401 updates the policy π(s, a) based on the policy improvement. The policy can be updated by, for example, replacing $p(s_t, a_t)$ with $p(s_t, a_t) + \beta \delta_t$ (β represents a step size parameter). That is, the actor 401 updates the policy using the policy improvement based on the reward. The critic 402 updates the state value function V(s) by, for example, replacing it with $V(s) + \alpha \delta_t$ (α represents step size parameter).

The right view of FIG. 4 schematically shows an example of a network configuration when the learning model used by the model processing unit 214 is implemented in a deep neural network (to be also simply referred to as an NN hereinafter). In this example, two neural networks of an actor and a critic are included. An input layer 410 is formed by, for example, 1,450 neurons, and corresponding feedback data are input.

Each signal input from the input layer 410 propagates in the forward direction through an actor hidden layer 411 or a critic hidden layer 412, and an output value is obtained from an output layer 413 or 414. The output from the NN of the actor is a policy (an action that can be taken), and the output from the NN of the critic is a state value. As an example, the actor hidden layer 411 is formed by, for example, a five-layer network structure, and the critic hidden layer 412 is formed by, for example, a three-layer network structure.

The output layer 413 of the actor is formed by, for example, 22 neurons, and the output layer 414 of the critic is formed by, for example, one neuron. For example, a column of the neurons of the output layer 413 is associated with a list of actions that can be taken, and each neuron represents a score at which the action should betaken or a probability at which the action is taken. If the value of each neuron is output in the output layer 413, an action is selected from the plurality of actions in accordance with the exploration parameter. For example, if the exploration parameter is the probability ε, an action is selected randomly at the probability ε, and an action indicating a highest score is selected at the probability 1−ε. Note that the number of neurons and the number of layers of the network and the network configuration can be changed appropriately, and another configuration may be used.

To optimize each neural network, it is necessary to change the weight parameter of each neural network. The weight parameter of each neural network is changed by, for example, error backpropagation using a predetermined loss function. In this embodiment, since there exist two networks of the actor and the critic, a loss function $L_{actor}$ of the actor and a loss function $L_{critic}$ of the critic are used in advance. The weight parameter of each network is changed by using, for example, a predetermined gradient descent optimization method (for example, RMSprop SGD) for each loss function.

The control unit 200 transmits the feedback data (state $s_t$) as learning data to the data collection server 110. Alternatively, the control unit 200 may transmit, to the data collection server 110, a set of the output (action at) of the actor corresponding to the feedback data (state $s_t$), the reward $r_{t+1}$, and the feedback data (state $s_{t+1}$) generated as a result of the action at as learning data. In this case, in the following description, a description that the feedback data are simply transmitted as learning data may be rephrased to mean that one set of pieces of information is transmitted as learning data.

<Overview of Exploration Parameter Setting Processing Corresponding to Event>

A change in exploration parameter set in the model processing unit 214 in accordance with an event occurring in the life cycle of the vehicle 100 will be described next with reference to FIG. 6.

FIG. 6 shows the relationship between the value (ordinate) of the exploration parameter and the time (abscissa), and schematically shows a state in which the value of the exploration parameter changes every time an event occurs. The exploration parameter corresponds to the value of the probability ε when the reinforcement learning algorithm selects an action randomly at the probability ε and selects an action in accordance with the policy at the probability 1−ε. The time represents time associated with the life cycle of the vehicle.

Assume that event 1 occurs at, for example, completion of vehicle manufacturing. In this case, the life cycle of the vehicle is defined at time (for example, at the time of development) before completion of vehicle manufacturing, and it is assumed that the learning model of the model processing unit 214 performs reinforcement learning during this period. In this case, time before completion of vehicle manufacturing may be, for example, time at which reinforcement learning progresses by simulation or the like on a server, in addition to time at which the vehicle actually travels. The origin of the time may be set at the time of completion of vehicle manufacturing, and event 1, event 2, ... may occur as subsequent events, as a matter of course.

The value of the exploration parameter is set to a value 601 before event 1 occurs, and is set to a value 602 in response to the occurrence of event 1. If event 1 is completion of vehicle manufacturing, the value 602 of the exploration parameter set after this event occurs is smaller than the value 601 of the exploration parameter set before this event occurs. The exploration parameter is set so that the exploration parameters before and after the occurrence of the event are discontinuous. This means that learning progresses before event 1 occurs to improve the accuracy of the learning model, and thus an exploratory element of reinforcement learning is lowered by one stage by using the occurrence of the event as a trigger. However, since the exploratory element is continuously left in collection of learning data even after completion of manufacturing, and the learning data including variations are collected, 0 is not set in the exploration parameter.

Similarly, if events 2 and 3 sequentially occur, the value of the exploration parameter is lowered every time, and may finally be set to 0 from 3. As described above, event 2 or 3 corresponds to a case in which traveling of the vehicle 100 reaches a predetermined traveling distance after completion of manufacturing or a case in which the version of the learning model is updated a predetermined number of times. In the example shown in FIG. 6, event 3 correspond to an event in which it is determined that the accuracy of the learning model is improved sufficiently.

Note that a case in which the exploration parameter takes a constant value such as the value 601 or 602 or a value 603 has been exemplified above. However, as indicated by curves 604 to 606, the exploration parameter between two events may change as a value of a function according to a value such as an elapsed time, the amount of collected learning data, or a traveling distance. In this case, the value of the exploration parameter indicated by the curves 604 to 606 changes to be discontinuous at the time of the occurrence of an event. Thus, if, for example, there is a long time (for example, in years) between events 1 and 2, the value of the exploration parameter can be changed gradually in accordance with the state of the vehicle.

Figures 10, 11:
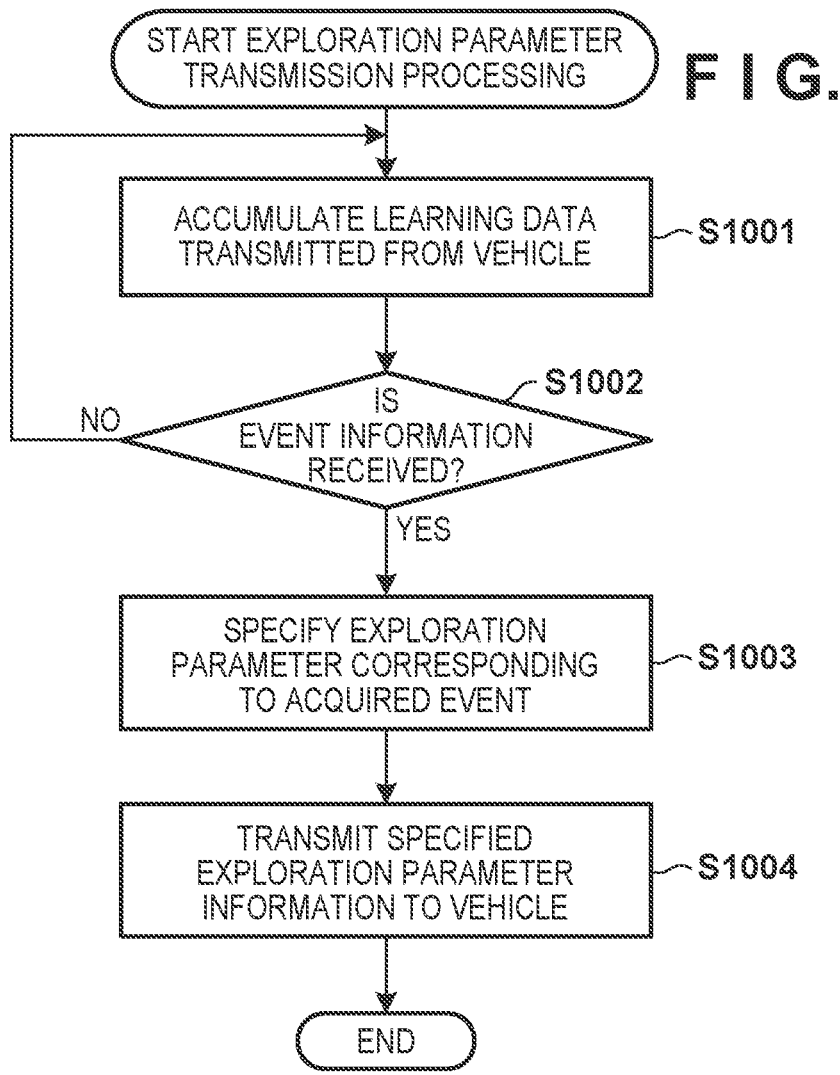
FIG. 10 is a flowchart illustrating a series of operations of exploration parameter transmission processing in the data collection server according to the embodiment.
FIG. 11 is a table for explaining correspondence between an event and a value of the exploration parameter according to the embodiment.

The exploration parameter may be associated with an event by, for example, a table of a predetermined format. FIG. 11 is a table for explaining correspondence between an event and a value of the exploration parameter. In this example, each value (a column of an exploration parameter 1102) of the exploration parameter is associated with each of events 1 to 3 (a column of an event 1101). Completion of vehicle manufacturing is defined as the first event, and the value of the exploration parameter is set to decrease. In this example, if the vehicle travels by a predetermined traveling distance threshold or more, the exploration parameter is lowered stepwise, and is, for example, finally set to zero.

The data collection server 110 stores this table in advance. Then, upon receiving event information from the vehicle 100, the data collection server 110 acquires the value of the exploration parameter with reference to the table, and transmits it to the vehicle 100. The vehicle 100 sets, in the model processing unit 214, the exploration parameter received from the data collection server 110, and executes the reinforcement learning algorithm.

<Series of Operations of Damper Control Processing in Vehicle>

A series of operations of the damper control processing in the vehicle will be described next with reference to FIG. 7. Note that this processing starts when the feedback data at time t is obtained in the description of FIG. 3. Note that the operation of the model processing unit 214 is performed at, for example, an operating frequency of 5 Hz. In this processing, for example, the initial exploration parameter is set in the model processing unit 214. Furthermore, processing by the components such as the model processing unit 214 and the actor 401 in the control unit 200 is implemented when the CPU 210 loads the program stored in the ROM 212 into the RAM 211 and executes it.

In step S701, the actor 401 accepts the feedback data from the data input unit 213, and outputs the action ($a_t$) based on the policy π(s, a). At this time, the model processing unit 214 selects an action from actions (corresponding to the output layer 413) output from the actor 401 in accordance with the set exploration parameter. Then, the model processing unit 214 outputs the control variable corresponding to the selected action.

In step S702, upon accepting the control variable from the model processing unit 214, the damper control unit 106 replaces the control variable used in the damper control unit 106 with the new control variable acquired from the model processing unit 214. Then, the damper control unit 106 controls the characteristic of each damper 107 by applying the replaced control variable to the feedback data. Note that in the flowchart shown in FIG. 7, steps S702 and S703 are described as one control operation for time t for the sake of simplicity. However, with respect to, for example, the feedback data acquirable at a speed of 1 KHz, the damper control unit 106 can control the damper characteristic at, for example, an operating frequency of 100 Hz, and control a control amount (a current amount for controlling the damping force of each damper 107) at the operating frequency. In this case, in fact, the processes in steps S702 and S703 can be repeated until time t+1. In step S703, the damper control unit 106 supplies the calculated control amount (for example, a current amount) to the damper to control the characteristic of the damper 107.

In step S704, the sensor unit 101 acquires the feedback data (for example, at an operating frequency of 1 KHz) until time t+1.

In step S705, the data input unit 213 applies the above-described preprocessing to the feedback data. In step S706, the reward decision unit 215 decides the above-described reward ($r_{t+1}$) based on the feedback data at time t+1, and outputs it to the critic 402. In step S707, the critic 402 calculates the above-described policy improvement (for example, the TD error) for improving the policy of the actor 401, and inputs it to the actor 401.

In step S708, the actor 401 updates the policy π(s, a) based on the policy improvement calculated in step S707. The actor 401 updates the policy by, for example, replacing $p(s_t, a_t)$ with $p(s_t, a_t)+\beta\delta_t$. In step S709, the critic 402 updates the state value function V(s) by, for example, replacing it with $V(s)+\alpha\delta_t$ (α represents the step size parameter). If the critic 402 updates the state value function, this processing ends. Although this embodiment has exemplified the operation from time t to time t+1, the series of operations shown in FIG. 7 may be repeated, and may end when a predetermined condition is satisfied.

<Series of Operations of Exploration Parameter Setting Processing in Vehicle>

A series of operations of the exploration parameter setting processing in the vehicle will be described next with reference to FIG. 8. Note that this processing starts when the feedback data at time t is obtained in the description of FIG. 3, and is executed individually in parallel with the damper control processing described with reference to FIG. 7. This processing is implemented when the CPU 210 loads the program stored in the ROM 212 into the RAM 211 and executes it.

In step S801, the data input unit 213 acquires the above-described processed feedback data based on the feedback data obtained from the sensor unit 101. The feedback data are collected as learning data in the actual environment, and are temporarily stored in the storage unit 108, as necessary. In step S802, the control unit 200 sequentially transmits, as learning data, the feedback data temporarily stored in the storage unit 108 to the data collection server 110.

In step S803, the event detection unit 217 determines whether a predetermined event occurs in the vehicle 100. For example, the event detection unit 217 detects completion of vehicle manufacturing when a predetermined function is activated in the vehicle 100 or when information indicating a predetermined version representing completion of manufacturing is stored in the ROM 212. Alternatively, completion of vehicle manufacturing or vehicle registration may be detected when information concerning completion of manufacturing or vehicle registration is input based on a user operation.

The event detection unit 217 refers to traveling distance information stored in the ROM 212 or the storage unit 108, and detects, if the traveling distance exceeds a predetermined traveling distance, a corresponding event. In addition, the event detection unit 217 may count the data amount of the transmitted learning data, and detect, if a predetermined data amount is exceeded, a corresponding event. Alternatively, the event detection unit 217 detects a corresponding event when a time elapses from a predetermined time point (for example, at the sales start of the initial vehicle model of the vehicle 100 or at the time of completion of manufacturing of the vehicle 100). If the event detection unit 217 detects an event, the control unit 20 advances the process to step S804; otherwise, the control unit 200 returns the process to step S801.

In step S804, the control unit 200 transmits event information indicating the detected event to the data collection server 110. The event information is, for example, an event identifier assigned in advance to the event.

In step S805, the exploration parameter setting unit 216 acquires the exploration parameter transmitted from the data collection server 110, and sets it in the model processing unit 214. The acquired exploration parameter includes, for example, the value (exploration parameter 1102) of the exploration parameter described with reference to FIG. 11.

In step S806, the model processing unit 214 executes calculation of the neural networks, and selects an action using the new exploration parameter. Then, the model processing unit 214 outputs a control variable corresponding to the selected action. At this time, the model processing unit 214 determines whether the control variable based on the randomly selected action can be allowed for safety, and can filter out the control variable if the model processing unit 214 determines that the control variable cannot be allowed. Whether the control variable can be allowed for safety may be determined using a determination condition determined in advance by an experiment and the like. In this way, even if an unusual output is selected by randomly selecting an action in the actual environment, safe control can be ensured.

In step S807, the control unit 200 determines whether to end vehicle control. If the control unit 200 determines to end vehicle control, it ends the series of processes; otherwise, it returns the process to step S801 and repeats the processing.

As described above, according to this embodiment, if an event in the life cycle of the vehicle is detected in the vehicle that executes control using reinforcement learning, the exploration parameter specified in accordance with the event is set as a value for adjusting the ratio of exploration in reinforcement learning. Then, processing using reinforcement learning is executed in accordance with the set exploration parameter. At this time, if the first event is detected, the exploration parameter that makes the ratio of exploration set during the first period after the first event smaller than the ratio of exploration set during the second period before the first event is detected. In this way, it is possible to continuously perform both exploration and exploitation in reinforcement learning in the life cycle of the vehicle in control of the vehicle.

<Arrangement of Data Collection Server>

Figure 9:
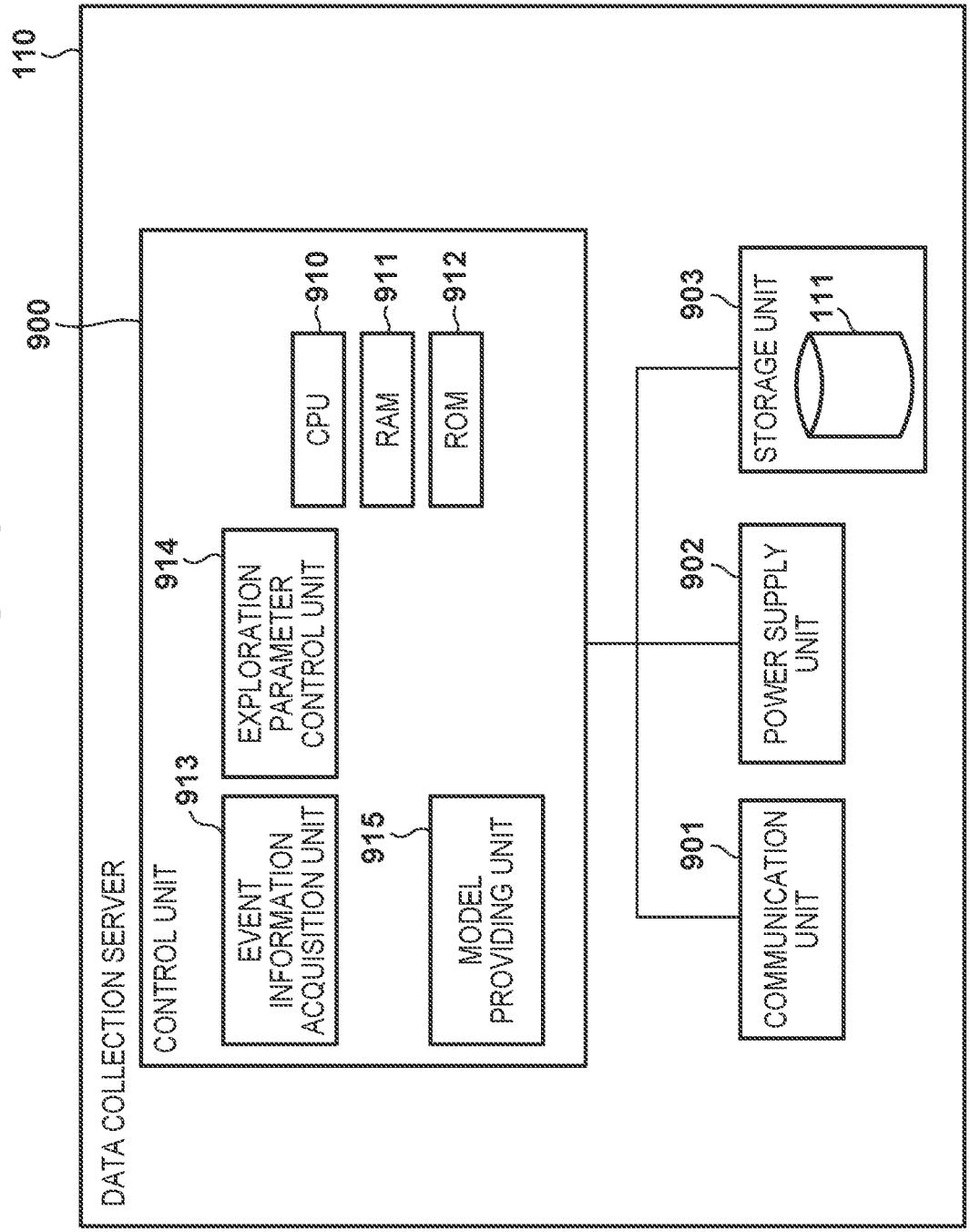
FIG. 9 is a block diagram showing an example of the functional arrangement of a data collection server as an example of an information processing server according to the embodiment.

An example of the functional arrangement of the data collection server as an example of the information processing server will be described next with reference to FIG. 9. Note that functional blocks to be described with reference to FIG. 9 may be integrated or separated, and a function to be described may be implemented by another block. A function described as hardware may be implemented by software and vice versa.

A control unit 900 includes, for example, a CPU 910, a RAM 911, and a ROM 912, and controls the operation of each unit of the data collection server 110. The control unit 900 exhibits the function of each unit forming the control unit 900 when the CPU 910 loads a computer program stored in the ROM 912 into the RAM 911 and executes it.

An event information acquisition unit 913 acquires (via a communication unit 901) event information transmitted from the vehicle 100. An exploration parameter control unit 914 specifies an exploration parameter corresponding to an event acquired by the event information acquisition unit 913. The exploration parameter control unit 914 transmits the specified exploration parameter to the vehicle that has transmitted the event information.

When updating the version of the learning model of the reinforcement learning algorithm set in the model processing unit 214 of the vehicle 100, a model providing unit 915 provides model information to the vehicle 100. The model information includes the version of the learning model and weight parameters of the neural networks. The model providing unit 915 can optimize the learning model on a server using learning data collected from the vehicle 100, thereby updating the version of the learning model.

The communication unit 901 is, for example, a communication device including a communication circuit, and communicates with the vehicle via a network such as the Internet. The communication unit 901 receives feedback data (learning data) information transmitted from the vehicle, and transmits exploration parameter information (or learning model information) to the vehicle 100. A power supply unit 902 supplies power to each unit in the data collection server 110.

A storage unit 903 is a nonvolatile memory such as a hard disk or a semiconductor memory. The storage unit 903 includes the DB 111 storing the above-described learning data information transmitted from the vehicle.

<Series of Operations of Exploration Parameter Transmission Processing in Data Collection Server>

A series of operations of exploration parameter transmission processing in the data collection server 110 will be described next with reference to FIG. 10. Note that this processing is implemented when the CPU 910 of the control unit 900 loads the program stored in the ROM 912 into the RAM 911 and executes it.

In step S1001, the event information acquisition unit 913 acquires, via the communication unit 901, the learning data transmitted from the vehicle 100, and accumulates it in the DB 111 of the storage unit 903. In step S1002, the control unit 900 determines whether event information is received from the vehicle 100. If event information is received, the control unit 900 advances the process to step S1003; otherwise, the control unit 900 returns the process to step S1001.

In step S1003, the exploration parameter control unit 914 specifies the exploration parameter corresponding to an event acquired by the event information acquisition unit 913. For example, the value of the exploration parameter associated with the event is specified based on a predetermined event ID.

In step S1004, the exploration parameter control unit 914 transmits the specified exploration parameter to the vehicle 100 that has transmitted the event information. After transmitting the exploration parameter to the vehicle 100, the data collection server 110 ends the processing.

As described above, the data collection server 110 specifies the exploration parameter that defines the probability of exploration of reinforcement learning based on the event information transmitted from the vehicle, and provides the specified exploration parameter to the vehicle. With this arrangement, the data collection server 110 can unitarily manage control of the exploration parameters of a number of vehicles traveling in the actual environment.

OTHER EMBODIMENTS

In the above-described embodiment, the control unit 200 of the vehicle 100 acquires feedback data, calculates a policy using reinforcement learning, and then selects a policy corresponding to the probability of exploration, thereby outputting a control variable. However, the processing of the control unit 200 may be performed on the side of the data collection server 110. That is, the vehicle transmits feedback data to the data collection server. The data collection server 110 calculates a policy using reinforcement learning for the received feedback data, and then selects a policy corresponding to the probability of exploration, thereby outputting a control variable corresponding to the policy to the vehicle 100. In this case, the steps described with reference to FIG. 7 and those described with reference to FIG. 8 are performed by the control unit 900 of the data collection server 110. Event detection in step S803 may be performed by receiving information necessary for event detection from the vehicle 100. For example, the data collection server 110 may include an event detection unit, and may receive information of completion of manufacturing or vehicle registration from the vehicle, count the data amount of learning data from the vehicle, or count an elapsed time from a predetermined time point.

In the above-described embodiment, the event information detected by the vehicle 100 is transmitted to the data collection server 110, and the server side specifies the exploration parameter based on the event information. However, this embodiment is not limited to this, and the vehicle 100 may specify the exploration parameter based on the detected event. In this case, the vehicle 100 may store a table that associates an event and the exploration parameter in, for example, the ROM 212 or the like, and specify the exploration parameter with reference to the table in response to detection of the occurrence of an event. With this arrangement, it is possible to obtain an advantage that control of the exploration parameter corresponding to the event is completed in the vehicle.

In the above-described embodiment, the data collection server 110 specifies the exploration parameter corresponding to the received event using the table concerning a predetermined event and the exploration parameter, which is common to all vehicles. To the contrary, the data collection server 110 may manage, for each individual vehicle, a table that associates the event and the exploration parameter, and the value of the exploration parameter for each event may be different for each individual vehicle. As an example, as in the example shown in FIG. 11, if an event is associated with a traveling distance (for example, traveling of a predetermined traveling distance (TH1) or more), when the time required until the event occurs is longer than a predetermined time period, the exploration parameter may be corrected to be smaller. For example, if event 2 takes a longer time to occur, as compared with a vehicle in which event 2 takes a standard time to occur, the value of the exploration parameter is corrected to a value smaller than 0.02. Thus, it is possible to implement control according to the state of the individual vehicle so as to decrease the number of vehicles in which a large value of the exploration parameter is set for a long period.

Alternatively, the data collection server 110 may set a different value of the exploration parameter in accordance with the model of each vehicle. If sufficient data have already been collected for the models of vehicles similar to each other, and the performance of the reinforcement learning algorithm used for the models of the vehicles has sufficiently been optimized, the exploration parameter of the target model may be set small.

SUMMARY OF EMBODIMENT

1. A control apparatus (for example, 200 or 100) according to the above-described embodiment comprises
 a detection unit (for example, 217) configured to detect an event in a life cycle of a predetermined system.
 a setting unit (for example, 216) configured to, in response to the detection of the event set an exploration parameter specified in accordance with the detected event as a value for adjusting a ratio of exploration in reinforcement learning, and
 a processing unit (for example, 214) configured to execute predetermined control for the predetermined system using the reinforcement learning in accordance with the set exploration parameter, wherein when a first event is detected, the setting unit sets the exploration parameter so that makes the ratio of the exploration set during a first period after the first event is smaller than the ratio of the exploration set during a second period before the first event is detected.

According to this embodiment, in control for the predetermined system (for example, a vehicle), it is possible to continuously perform both exploration and exploitation in reinforcement learning in the life cycle of the predetermined system.

2. In the above-described embodiment, the setting unit sets the exploration parameter that sets the ratio of the exploration set during the first period to be nonzero.

According to this embodiment, even in a period after the event is detected, it is possible to continuously leave an exploratory element in collection of learning data.

3. In the above-described embodiment, the setting unit sets the exploration parameter so that the ratio of the exploration set during the first period and the ratio of the exploration set during the second period are discontinuous.

According to this embodiment, it is possible to lower the exploration parameter stepwise in accordance with occurrence of the event.

4. In the above-described embodiment, the event includes at least one of completion of a procedure for the predetermined system, reaching to a specific use state of the predetermined system, and update of a constituent element for controlling the predetermined system.

According to this embodiment, it is possible to process various kinds of events in the life cycle of the predetermined system (for example, a vehicle), and change the ratio of the exploration in accordance with occurrence of these events.

5. In the above-described embodiment, the completion of the procedure for the predetermined system includes at least one of completion of manufacturing of the predetermined system and completion of registration of the predetermined system.

According to this embodiment, it is possible to control the exploration parameter in accordance with procedures for some predetermined systems (for example, vehicles). For example, upon completion of vehicle manufacturing, the exploration parameter set in a preceding development stage can be lowered after the event.

6. In the above-described embodiment, the reaching to the specific use state of the predetermined system includes at least one of a lapse of a predetermined number of days from a predetermined time point and traveling of a predetermine traveling distance from a predetermined time point.

According to this embodiment, it is possible to control the exploration parameter in accordance with the specific use state of the predetermined system such as the number of elapsed days or a traveling distance.

7. In the above-described embodiment, the update of the constituent element for controlling the predetermined system includes update of a version of a learning model used for the reinforcement learning.

According to this embodiment, it is possible to control the exploration parameter in accordance with the update of the version of the learning model used for the reinforcement learning.

8. In the above-described embodiment, the control apparatus further comprises a specifying unit configured to specify the exploration parameter in accordance with the detected event.

According to this embodiment, it is possible to specify the exploration parameter in accordance with the event in the predetermined system.

9. In the above-described embodiment, the control apparatus further comprises
a transmission unit (for example, 102) configured to transmit the detected event to an external server, and
a reception unit (for example, 102) configured to receive, from the external server, the exploration parameter specified in accordance with the event.

According to this embodiment, it is possible to specify the exploration parameter in accordance with the event in the external server, and save computer resources in the vehicle.

10. In the above-described embodiment, the exploration parameter is different for each predetermined system or each model of the predetermined system.

According to this embodiment, it is possible to set the exploration parameter in accordance with a method of using an individual predetermined system and the characteristic of the model of the predetermined system by changing exploration and exploitation for each individual predetermined system (for example, each vehicle) or each model of the predetermined system.

11. In the above-described embodiment, input information and output information for a model of the reinforcement learning executed by the processing unit are provided as learning data to an external server.

According to this embodiment, it is possible to transmit, to the external server, usable data including variations useful for learning of the reinforcement learning.

The invention is not limited to the foregoing embodiments, and various variations/changes are possible within the spirit of the invention.

What is claimed is:

1. A control apparatus for performing predetermined control for a predetermined system using reinforcement learning, comprising:
one or more processors; and
a memory storing instructions which, when the instructions are executed by the one or more processors, cause the control apparatus to function as:
a detection unit configured to detect an event in a life cycle of the predetermined system;
a setting unit configured to, in response to the detection of the event, set an exploration parameter specified in accordance with the detected event as a value for adjusting a ratio of exploration in the reinforcement learning; and
a processing unit configured to execute the predetermined control using the reinforcement learning in accordance with the set exploration parameter,
wherein when a first event is detected, the setting unit sets the exploration parameter so that the ratio of the exploration set during a first period after the first event is smaller than the ratio of the exploration set during a second period before the first event is detected.

2. The apparatus according to claim 1, wherein the setting unit sets the exploration parameter that sets the ratio of the exploration set during the first period to be nonzero.

3. The apparatus according to claim 1, wherein the setting unit sets the exploration parameter so that the ratio of the exploration set during the first period and the ratio of the exploration set during the second period are discontinuous.

4. The apparatus according to claim 1, wherein the event includes at least one of completion of a procedure for the predetermined system, reaching to a specific use state of the predetermined system, and update of a constituent element for controlling the predetermined system.

5. The apparatus according to claim 4, wherein the completion of the procedure for the predetermined system includes at least one of completion of manufacturing of the predetermined system and completion of registration of the predetermined system.

6. The apparatus according to claim 4, wherein the reaching to the specific use state of the predetermined system includes at least one of a lapse of a predetermined number of days from a predetermined time point and traveling of a predetermine traveling distance from a predetermined time point.

7. The apparatus according to claim 4, wherein the update of the constituent element for controlling the predetermined system includes update of a version of a learning model used for the reinforcement learning.

8. The apparatus according to claim 1, further comprising a specifying unit configured to specify the exploration parameter in accordance with the detected event.

9. The apparatus according to claim 1, the instructions further cause the control apparatus to function as:
a transmission unit configured to transmit the detected event to an external server; and
a reception unit configured to receive, from the external server, the exploration parameter specified in accordance with the event.

10. The apparatus according to claim 1, wherein the exploration parameter is different for each predetermined system or each model of the predetermined system.

11. The apparatus according to claim 1, the instructions further cause the control apparatus to function as a providing unit configured to provide, as learning data, input information and output information for a model of the reinforcement learning executed by the processing unit to an external server.

12. A control method for a control apparatus that performs predetermined control for a predetermined system using reinforcement learning, comprising:
detecting an event in a life cycle of the predetermined system;
setting, in response to the detection of the event, an exploration parameter specified in accordance with the detected event as a value for adjusting a ratio of exploration in the reinforcement learning; and
executing the predetermined control using the reinforcement learning in accordance with the set exploration parameter,
wherein when a first event is detected, the exploration parameter is set in the setting so that the ratio of the exploration set during a first period after the first event is smaller than the ratio of the exploration set during a second period before the first event is detected.

13. A non-transitory computer readable storage medium storing an instruction for executing a control method for a control apparatus that performs predetermined control for a predetermined system using reinforcement learning, the instruction causing, when executed by a processor of the control apparatus, the processor to execute:
detecting an event in a life cycle of the predetermined system;
setting, in response to the detection of the event, an exploration parameter specified in accordance with the detected event as a value for adjusting a ratio of exploration in the reinforcement learning; and
executing the predetermined control using the reinforcement learning in accordance with the set exploration parameter,
wherein when a first event is detected, the exploration parameter is set in the setting so that the ratio of the exploration set during a first period after the first event is smaller than the ratio of the exploration set during a second period before the first event is detected.

14. An information processing server for performing predetermined control for a predetermined system using reinforcement learning, comprising:
one or more processors; and
a memory storing instructions which, when the instructions are executed by the one or more processors, cause the information processing server to function as:
a detection unit configured to detect an event in a life cycle of the predetermined system;
a setting unit configured to, in response to the detection of the event set an exploration parameter specified in accordance with the detected event as a value for adjusting a ratio of exploration in the reinforcement learning;
a processing unit configured to execute processing for the predetermined control using the reinforcement learning in accordance with the set exploration parameter; and
a transmission unit configured to transmit a processing result of the processing unit to the predetermined system,
wherein when a first event is detected, the setting unit sets the exploration parameter so that the ratio of the exploration set during a first period after the first event is smaller than the ratio of the exploration set during a second period before the first event is detected.

15. An information processing method, executed by an information processing server, of performing predetermined control for a predetermined system using reinforcement learning, the method comprising:
detecting an event in a life cycle of the predetermined system;
setting, in response to the detection of the event, an exploration parameter specified in accordance with the detected event as a value for adjusting a ratio of exploration in the reinforcement learning;
executing processing for the predetermined control using the reinforcement learning in accordance with the set exploration parameter; and
transmitting a processing result in the executing to the predetermined system,
wherein when a first event is detected, the exploration parameter is set in the setting so that the ratio of the exploration set during a first period after the first event is smaller than the ratio of the exploration set during a second period before the first event is detected.

16. A control system comprising a control apparatus configured to perform predetermined control for a predetermined system using reinforcement learning, and an information processing server,
the control apparatus comprising:
one or more processors; and
a memory storing instructions which, when the instructions are executed by the one or more processors, cause the control apparatus to function as:
a detection unit configured to detect an event in a life cycle of the predetermined system,
a first transmission unit configured to transmit, in response to the detection of the event, the detected event to the information processing server,
a setting unit configured to set an exploration parameter specified in accordance with the event and received from the information processing server as a value for adjusting a ratio of exploration in the reinforcement learning, and a processing unit configured to execute the predetermined control using the reinforcement learning in accordance with the set exploration parameter, wherein when a first event is detected, the setting unit sets the exploration parameter so that the ratio of the exploration set during a first period after the first event is smaller than the ratio of the exploration set during a second period before the first event is detected, and the information processing server comprising:

one or more processors; and a memory storing instructions which, when the instructions are executed by the one or more processors, cause the information processing server to function as:

a specifying unit configured to specify the exploration parameter in accordance with the event, and a second transmission unit configured to transmit the specified exploration parameter to the predetermined system.

* * * * *